Nov. 23, 1926.  
W. L. THAETE  
1,607,969  
AUTOMATIC SHUT-OFF ATTACHMENT FOR FAUCETS  
Filed Nov. 10, 1924
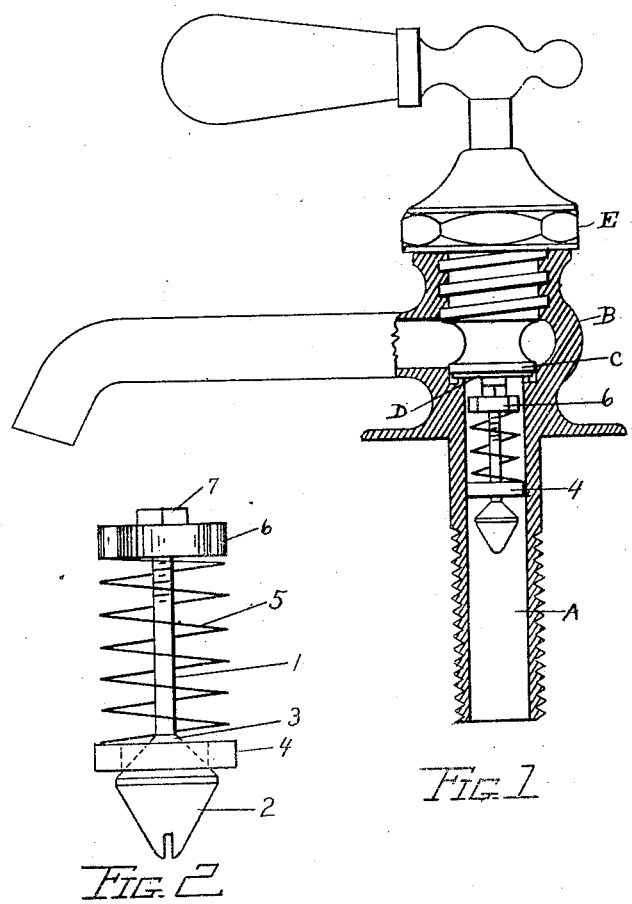
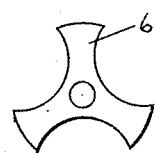
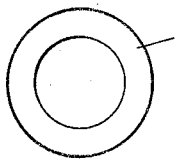
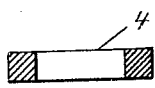
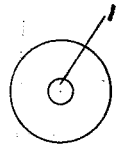
Fig. 3   Fig. 4   Fig. 5   Fig. 6
INVENTOR  
William L. Thaete  
By Fred E. Mefford  
Attorney Patented Nov. 23, 1926.

1,607,969

UNITED STATES PATENT OFFICE.

WILLIAM L. THAETE, OF COLORADO SPRINGS, COLORADO, ASSIGNOR TO THAETE AUTOMATIC VALVE CORPORATION, OF DENVER, COLORADO, A CORPORATION OF COLORADO.

AUTOMATIC SHUT-OFF ATTACHMENT FOR FAUCETS.

Application filed November 10, 1924. Serial No. 749,011.

My invention relates to shut-off valves for faucets and the like and the object is to provide a device which can be disposed within a faucet, union, T, L, connection, pipe or other place having a suitable core, by a simple and inexpensive method.

Figure 1 represents an elevation of a faucet, partly in section, with the device disposed therein; Fig. 2, an elevation of the assembled device, drawn to an enlarged scale; Fig. 3, a plan view of the fluted nut; Fig. 4, a plan view of the ring; Fig. 5, a cross section of the ring, and Fig. 6, a plan view of the rod.

In the present drawings I have shown the preferred embodiment of my invention, but I do not confine myself to the precise form therein shown, but wish it understood that various modifications and adaptations may be made within the scope of the claims, without departing from the spirit of the invention.

The device comprises a threaded rod 1 having a bifurcated conical head 2 with a convex base 3, a ring, having a smooth periphery 4 disposed on said rod adjacent to the convex base 3 of said head, an open spring 5 disposed on said rod, a fluted nut 6 screwed on said rod, and a lock nut 7 for said fluted nut. The nut 6 or abutment member is provided with a number of peripheral notches for the reception of a tool, as for example, a nail, a screw driver or other convenient article to prevent such member from rotating when the head 2 is rotated.

The inlet A of the faucet B is reamed to the proper diameter to make a tight fit for the ring, the assembled device inserted and the ring 4 driven or otherwise forced to the position shown in Fig. 1, care being taken to drive said ring far enough to permit the flow of water when the valve C is open.

When a new washer D is required, the packing nut E is unscrewed and the valve C screwed out, which removes the pressure on rod 1 and permits the spring 5 to force the convex base 3 of the head against the ring 4 and shut off the flow of water. When the valve C is again screwed back into place, it forces rod 1 down and permits the water to flow through ring 4.

The faucets already in use in a building can be equipped with this device in the manner above described at a small fraction of the cost of new faucets having automatic shut-offs.

The device can be disposed in pipes and pipe fittings such as T's, crosses, Y's, couplings, unions, etc. and be used as a pressure release valve or as a check valve. By boring a suitable hole in any metallic article and inserting the device, said article can be provided with a spring valve.

When the device becomes worn, the ring may be driven out and a new device inserted.

The tension of the spring or the position of the head which regulates the flow of water may be adjusted by inserting a screw driver in the bifurcation in the head of rod 1 and turning said rod in fluted nut 6.

I claim:

1. A faucet fitting adapted to be forced into the smooth interior of a standard faucet, said fitting comprising an abutment member, an auxiliary valve portion, and a seat member, said seat member adapted to hold the fitting in its inserted position in the faucet.

2. A faucet fitting adapted to be forced into the smooth interior of a standard faucet, said fitting comprising an abutment member, an annular ring member and an auxiliary valve portion, said ring member adapted by a driven fit to hold the fitting in its inserted position in the faucet.

3. A faucet fitting adapted to be forced into the smooth interior of a standard faucet, said fitting comprising an abutment member, a seat member, an auxiliary valve portion, and resilient means disposed about the said valve portion between the abutment and seat members, said seat member adapted to hold the fitting in its inserted position in the faucet.

4. A faucet fitting adapted to be forced into the smooth interior of a standard faucet, said fitting comprising an abutment member, an annular ring member, and an auxiliary valve portion including a stem extending through said ring member and having one end thereof secured to said abutment member, said ring member adapted to hold the fitting in its inserted position in the faucet.

5. A faucet fitting adapted to be forced into the smooth interior of a standard faucet, said fitting comprising an abutment member, an annular ring member, an auxiliary valve portion including a ball and a stem extending through said ring member and having one end thereof secured to said abutment member, and resilient means disposed about the said stem between the abutment and ring members, said ring member adapted to hold the fitting in its inserted position in the faucet.

6. A faucet fitting adapted to be forced into the smooth interior of a standard faucet, said fitting comprising an abutment member, an annular ring member, and an auxiliary valve portion including a kerfed head and a stem extending through said ring member and said head and having the end adjacent said head secured to said abutment member, said ring member adapted by a driven fit to hold the fitting in its inserted position in the faucet.

7. The faucet fitting as set forth in claim 1 in combination with a standard faucet.

WILLIAM L. THAETE.